United States Patent
Herman et al.

(10) Patent No.: US 11,356,617 B2
(45) Date of Patent: Jun. 7, 2022

(54) VEHICLE SENSOR OPERATION

(71) Applicant: Ford Global Technologies, LLC, Dearborn, MI (US)

(72) Inventors: David Michael Herman, Oak Park, MI (US); Aaron Lesky, Ypsilanti, MI (US); Ronald Beras, Warren, MI (US); Ashwin Arunmozhi, Canton, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/995,943

(22) Filed: Aug. 18, 2020

(65) Prior Publication Data
US 2022/0060641 A1 Feb. 24, 2022

(51) Int. Cl.
*H04N 5/262* (2006.01)
*G01L 1/22* (2006.01)
(Continued)

(52) U.S. Cl.
CPC ............. *H04N 5/2628* (2013.01); *G01L 1/22* (2013.01); *G01L 5/00* (2013.01); *H04N 5/2253* (2013.01); *H04N 17/002* (2013.01)

(58) Field of Classification Search
CPC .. H04N 5/2628; H04N 17/002; H04N 5/2253; G01L 5/00; G01L 1/22
See application file for complete search history.

(56) References Cited

U.S. PATENT DOCUMENTS

| 3,161,045 A | 12/1964 | Ames, Jr. |
| 5,600,576 A | 2/1997 | Broadwater et al. |

(Continued)

FOREIGN PATENT DOCUMENTS

| CN | 106970141 A | 7/2017 | |
| EP | 0412791 A2 * | 2/1991 | ......... B60G 17/0195 |
| EP | 0412791 A2 | 2/1991 | |

OTHER PUBLICATIONS

Broggi et al. "Self-Calibration of a Stereo Vision System for Automotive Applications", Proceedings of 20021 IEEE, International Conference on Robotics and Automation, Seoul, Korea—May 21-26, 2001 (Year: 2001).*

(Continued)

*Primary Examiner* — Richard A Hansell, Jr.
(74) *Attorney, Agent, or Firm* — Frank A. MacKenzie; Bejin Bieneman PLC (57) ABSTRACT

A computer includes a processor and a memory storing instructions executable by the processor to input strain data measuring mechanical strain on a vehicle camera and operation data of a vehicle component, the operation data describing at least one of an output or a state of the vehicle component, to a machine learning program that outputs a displacement of the vehicle camera from a neutral position based on the strain data and the operation data. The instructions further include instructions to identify a transformation matrix that transforms data from the vehicle camera to a coordinate system of the vehicle camera in the neutral position based on the output displacement of the vehicle camera, to apply the transformation matrix to data collected by the vehicle camera to generate transformed data, and to actuate one of the vehicle component or a second vehicle component based on the transformed data.

19 Claims, 6 Drawing Sheets

(51) Int. Cl.
*H04N 17/00* (2006.01)
*H04N 5/225* (2006.01)
*G01L 5/00* (2006.01)

(56) References Cited

U.S. PATENT DOCUMENTS

| | | | |
|---|---|---|---|
| 6,609,051 | B2 | 8/2003 | Fiechter et al. |
| 7,365,653 | B2 | 4/2008 | Yang et al. |
| 10,294,742 | B2 | 5/2019 | Lovorn et al. |
| 2016/0035150 | A1 | 2/2016 | Barfield, Jr. et al. |
| 2016/0360194 | A1* | 12/2016 | Kudrolli .............. H04N 17/002 |
| 2017/0104979 | A1* | 4/2017 | Shaw .................... H04N 13/239 |
| 2020/0334861 | A1* | 10/2020 | Jin ............................ G06T 7/85 |

OTHER PUBLICATIONS

Broggi et al., "Self-Calibration of a Stereo Vision System for Automotive Applications", Proceedings of the 2001 IEEE International Conference on Robotics & Automation Seoul, Korea—May 21-26, 2001.

Dang et al., "Continuous Stereo Self-Calibration by Camera Parameter Tracking", IEEE Transactions on Image Processing, vol. 18, No. 7, Jul. 2009.

"Fiber Sensing Products", Luna, https://lunainc.com/fiber-optic-solutions/fiber-sensing-solutions/, Aug. 15, 2019.

Gu et al., "Coded Rolling Shutter Photography: Flexible Space-Time Sampling", This research was supported in part by Sony Corporation and the National Science Foundation (IIS-03-25867 and CCF-05-41259), Mar. 15, 2010.

"Image processing and computer vision", Presentation transcript, https://slideplayer.com/slide/4915266/, Aug. 15, 2019.

Ling et al., "High-Precision Online Markerless Stereo Extrinsic Calibration", This work was supported by HKUST project R9341, Oct. 10, 2016.

"Measuring Small Strains with the ODiSI B", Luna, Revison 1—Apr. 8, 2013 (EN-FY1324).

Nedevschi et al., Online Extrinsic Parameters Calibration for Stereovision Systems Used in Far-Range Detection Vehicle Applications, IEEE Transactions on Intelligent Transportation Systems, vol. 8, No. 4, Dec. 2007.

"ODiSI-B—Optical Distributed Sensor Interrogator", Data Sheet, Luna, Rev. 13, Feb. 10, 2017.

Santoro et al., "Misalignment Correction for Depth Estimation using Stereoscopic 3-D Cameras", School of Electrical and Computer Engineering, Georgia Institute of Technology, Atlanta, GA 30332, Jun. 18, 2012.

* cited by examiner

VEHICLE SENSOR OPERATION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway. Vehicles may use computing devices configured to identify objects from image data collected by the vehicle sensors.

DETAILED DESCRIPTION

A system includes a computer including a processor and a memory, the memory storing instructions executable by the processor to input strain data measuring mechanical strain on a vehicle camera and operation data of a vehicle component, the operation data describing at least one of an output or a state of the vehicle component, to a machine learning program that outputs a displacement of the vehicle camera from a neutral position based on the strain data and the operation data, based on the output displacement of the vehicle camera, identify a transformation matrix that transforms data from the vehicle camera to a coordinate system of the vehicle camera in the neutral position, apply the transformation matrix to data collected by the vehicle camera to generate transformed data, and actuate one of the vehicle component or a second vehicle component based on the transformed data.

The operation data can include at least one of a tire pressure, a suspension length, a wheel speed, or a brake pressure.

The instructions can further include instructions to input further data including at least one of a vehicle speed or a vehicle acceleration to the machine learning program to output the displacement of the vehicle camera.

The machine learning program can be one of a deep neural network or a gradient boosted tree.

The vehicle component can be one of a plurality of vehicle components, and the instructions can further include instructions input the strain data and operation data from the plurality of vehicle components to the machine learning program to output the displacement of the vehicle camera.

The system can further include a strain sensor to collect the strain data, wherein the strain sensor is one of a strain gauge, an accelerometer, or a strain bolt.

The vehicle camera can be fixed to a mount with the strain bolt.

The transformation matrix can transform the data from the vehicle camera based on a focal length of the vehicle camera.

The displacement can include a lateral displacement, a longitudinal displacement, and a vertical displacement.

The instructions can further include instructions to input strain data of a second vehicle camera and the operation data to the machine learning program, to output a displacement of the second vehicle camera, and to identify a second transformation matrix that transforms data from the second vehicle camera to a coordinate system of the second vehicle camera in the neutral position.

The instructions can further include instructions to apply the second transformation matrix to data from the second vehicle camera to generate second transformed data and to generate a three-dimensional image based on the transformed data and the second transformed data.

The instructions can further include instructions to identify an object in the three-dimensional image.

The instructions can further include instructions to identify a distance from the vehicle camera to the object based on the three-dimensional image.

The instructions can further include instructions to combine respective pixels of the transformed data with corresponding pixels of the second transformed data to generate the three-dimensional image.

A method includes inputting strain data measuring mechanical strain on a vehicle camera and operation data of a vehicle component, the operation data describing at least one of an output or a state of the vehicle component, to a machine learning program that outputs a displacement of the vehicle camera from a neutral position based on the strain data and the operation data, based on the output displacement of the vehicle camera, identifying a transformation matrix that transforms data from the vehicle camera to a coordinate system of the vehicle camera in the neutral position, applying the transformation matrix to data collected by the vehicle camera, and actuating one of the vehicle component or a second vehicle component based on the transformed data.

The method can further include inputting further data including at least one of a vehicle speed or a vehicle acceleration to the machine learning program to output the displacement of the vehicle camera.

The vehicle component can be one of a plurality of vehicle components, and the method can further include inputting the strain data and operation data from the plurality of vehicle components to the machine learning program to output the displacement of the vehicle camera.

The method can further include inputting strain data of a second vehicle camera and the operation data to the machine learning program, outputting a displacement of the second vehicle camera, and identifying a second transformation matrix that transforms data from the second vehicle camera to a coordinate system of the second vehicle camera in the neutral position.

The method can further include applying the second transformation matrix to data from the second vehicle camera to generate second transformed data and generating a three-dimensional image based on the transformed data and the second transformed data.

The method can further include identifying an object in the three-dimensional image.

The method can further include identifying a distance from the vehicle camera to the object based on the three-dimensional image.

The method can further include combining respective pixels of the transformed data with corresponding pixels of the second transformed data to generate the three-dimensional image.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A stereo camera assembly of a vehicle includes a pair of cameras that collect image data. Based on the image data collected by both cameras, a vehicle computer can generate a three-dimensional image to identify objects in an environment around the vehicle. When the vehicle encounters disturbances in a roadway, e.g., gravel, potholes, rumble strips, etc., vibrations can travel through the vehicle to the stereo camera assembly. The vibrations can move the cameras away from a neutral position, causing errors in the collected images and the three-dimensional image generated from the collected images.

The computer can collect data from the cameras and data about operation of vehicle components that could cause vibrations and can use the data to compensate for the errors in the images caused by the vibrations. For example, the computer can collect strain data indicating mechanical strain on the cameras, the strain indicating movement of the cameras from their respective neutral positions. In another example, the computer can collect data about operation of one or more components, e.g., tire pressure, throttle position, etc., that can cause vibrations. The computer can input the operation data to a machine learning program, e.g., a neural network, that is trained to determine a displacement of the camera from the neutral position. Based on the displacement, the computer can transform the images collected by the camera to a coordinate system of the camera in the neutral position, reducing the errors in the images and the three-dimensional image generated by the computer. Using the operation data and strain data to account for displacement of the cameras caused by vibrations improves the image data used by the computer to generate the three-dimensional image, thereby improving detection of objects in the three-dimensional image.

Figure 1:
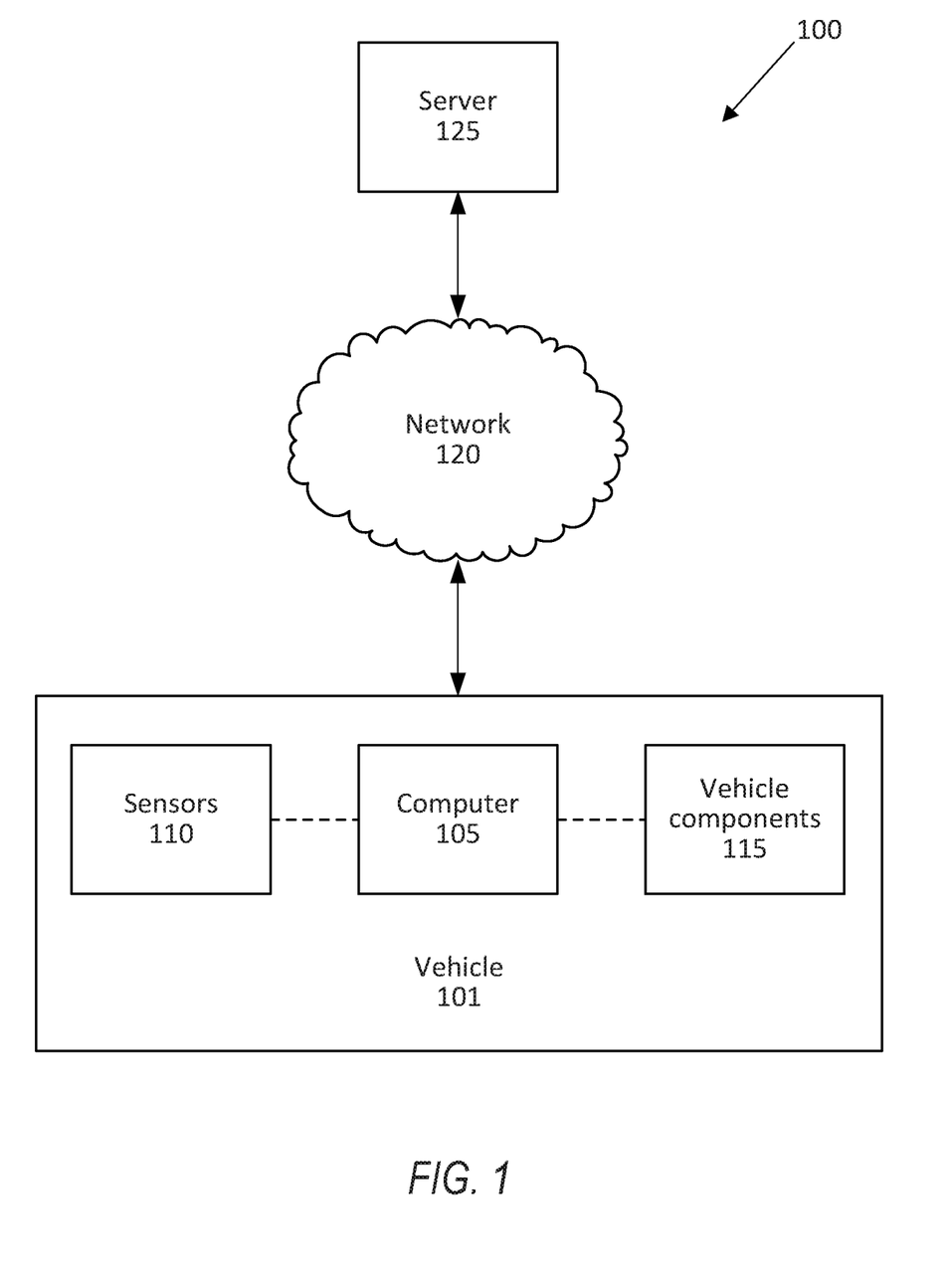
FIG. 1 is a diagram of an example system for operating sensors of a vehicle.

FIG. 1 illustrates an example system 100 for operating sensors 110 of a vehicle 101. A computer 105 in the vehicle 101 is programmed to receive collected data from one or more sensors 110. For example, vehicle 101 data may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. For example, the computer 105 can be a generic computer with a processor and memory as described above and/or may include a dedicated electronic circuit including an ASIC that is manufactured for a particular operation, e.g., an ASIC for processing sensor data and/or communicating the sensor data. In another example, computer 105 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 105.

In addition, the computer 105 may be programmed for communicating with the network 120, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 110. The memory can be a separate device from the computer 105, and the computer 105 can retrieve information stored by the memory via a network in the vehicle 101, e.g., over a CAN bus, a wireless network, etc. Alternatively or additionally, the memory can be part of the computer 105, e.g., as a memory of the computer 105.

Sensors 110 can include a variety of devices. For example, various controllers in a vehicle 101 may operate as sensors 110 to provide data via the vehicle 101 network or bus, e.g., data relating to vehicle speed, acceleration, location, subsystem and/or component status, etc. Further, other sensors 110 could include cameras, motion detectors, etc., i.e., sensors 110 to provide data for evaluating a position of a component, evaluating a slope of a roadway, etc. The sensors 110 could, without limitation, also include short range radar, long range radar, LIDAR, and/or ultrasonic transducers.

Collected data can include a variety of data collected in a vehicle 101. Examples of collected data are provided above, and moreover, data are generally collected using one or more sensors 110, and may additionally include data calculated therefrom in the computer 105, and/or at the server 125. In general, collected data may include any data that may be gathered by the sensors 110 and/or computed from such data.

The vehicle 101 can include a plurality of vehicle components 115. In this context, each vehicle component 115 includes one or more hardware components adapted to perform a mechanical function or operation—such as moving the vehicle 101, slowing or stopping the vehicle 101, steering the vehicle 101, etc. Non-limiting examples of components 115 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 115 can include computing devices, e.g., electronic control units (ECUs) or the like and/or computing devices such as described above with respect to the computer 105, and that likewise communicate via a vehicle 101 network.

For purposes of this disclosure, the term "autonomous vehicle" refers to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 120 connected to a server 125. The computer 105 can further be programmed to communicate with one or more remote sites such as the server 125, via the network 120, such remote site possibly including a processor and a memory. The network 120 represents one or more mechanisms by which a vehicle computer 105 may communicate with a remote server 125. Accordingly, the network 120 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
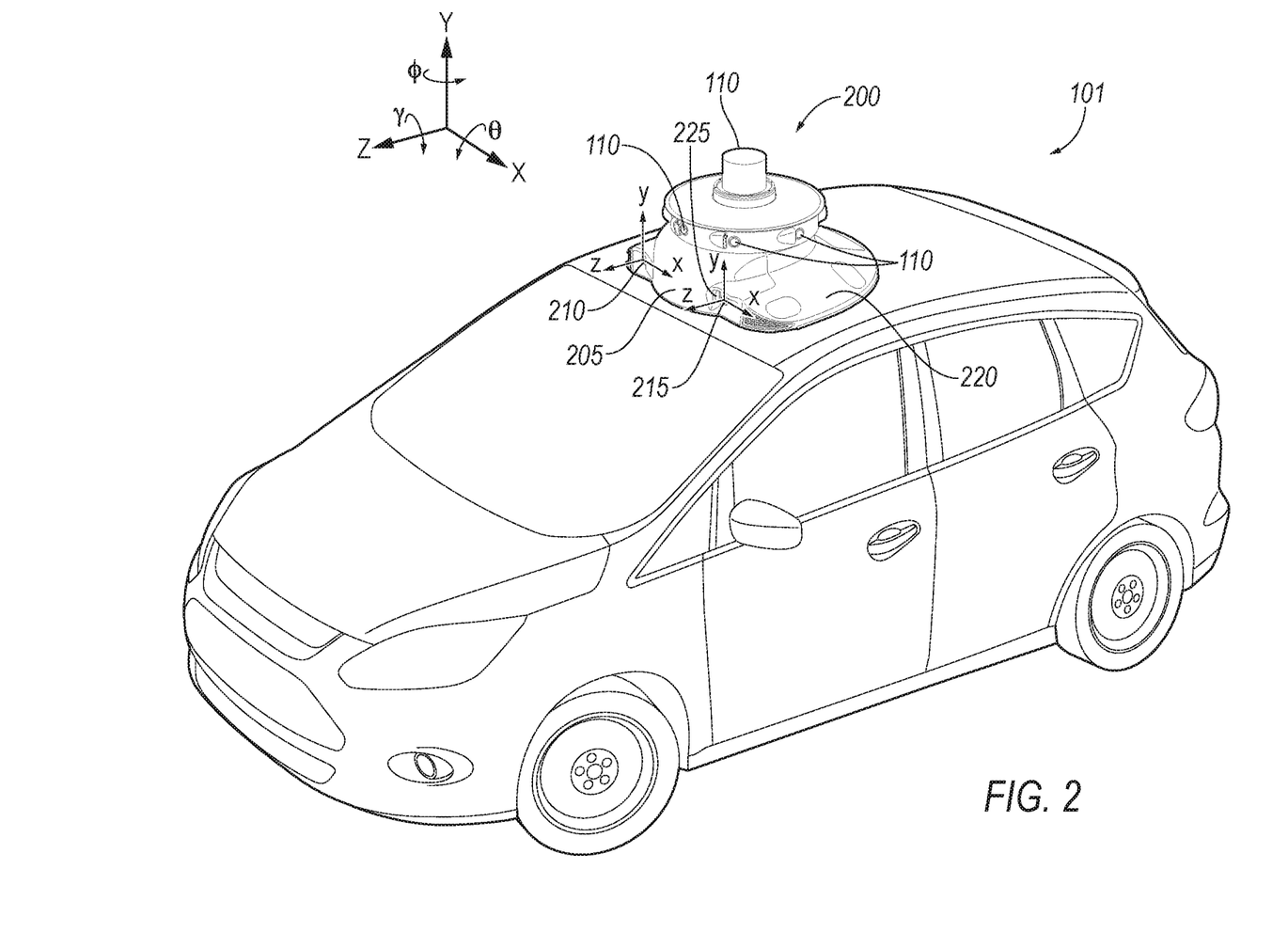
FIG. 2 is a perspective view of the vehicle with a sensor assembly.

FIG. 2 is a side view of an example vehicle 101. The vehicle 101 includes a sensor assembly 200 (shown mounted to a roof of the vehicle 101 in the example of FIG. 2 but could additionally or alternatively be mounted elsewhere on the vehicle 101). The sensor assembly 200 includes a plurality of sensors 110 to collect data of a surrounding environment of the vehicle 101. The computer 105 can actuate the sensors 110 on the sensor assembly to collect data and can actuate one or more components 115 based on the collected data. The sensor assembly 200 includes a stereo camera assembly 205 including two cameras 210, 215, described below.

The computer 105 can collect operation data of one or more vehicle components 115. In this context, "operation data" is data describing at least one of an output or a state of the vehicle 101 and/or a vehicle component 115. For example, the operation data can include, e.g., a tire pressure, a suspension length, a wheel speed, a brake pressure, a speed of the vehicle 101, an acceleration of the vehicle 101, etc. Additionally, the computer 105 can collect acceleration data from an inertial measurement unit (IMU). An "inertial measurement unit" is a set of sensors 110 that detect linear acceleration and rotational accelerations in a vehicle coordinate system. The IMU sensors 110 can include, e.g., accelerometers, gyroscopes, pressure sensors, magnetometers, etc. The computer 105 can input the operation data and/or the IMU data into a machine learning program to determine strains on one or more sensors 110.

Figure 3:
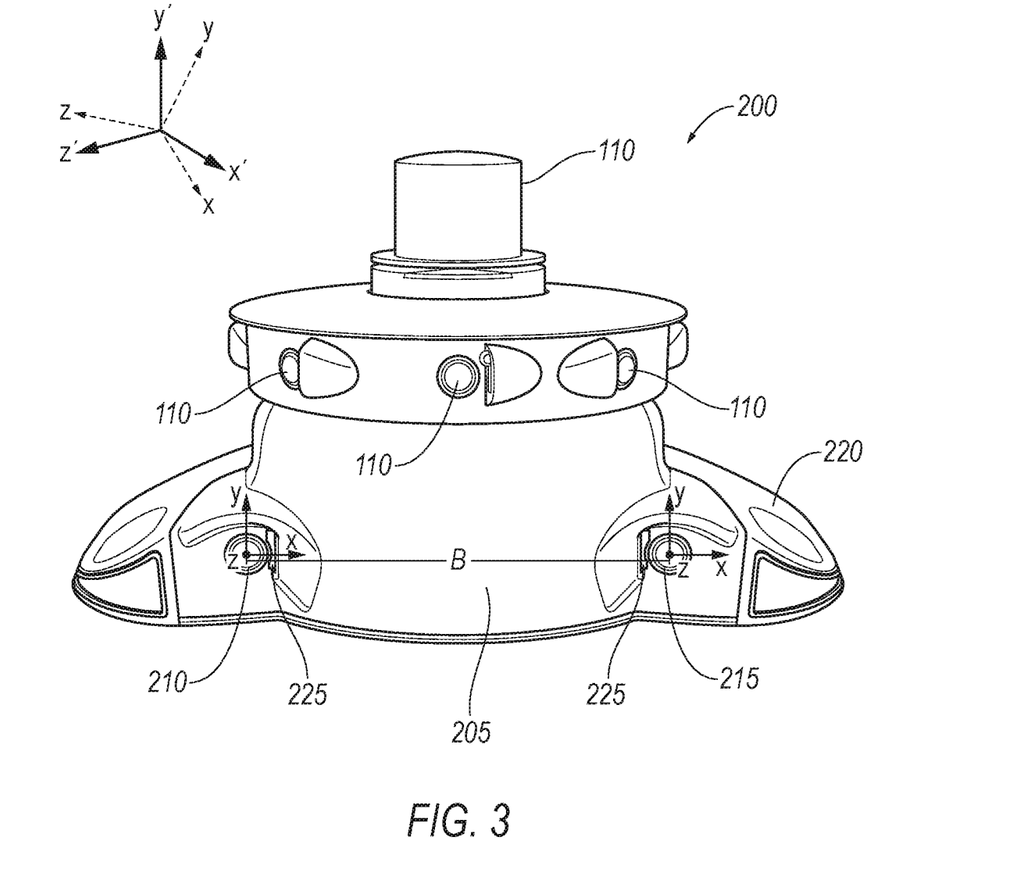
FIG. 3 is a front view of the sensor assembly.

FIG. 3 is a perspective view of the stereo camera assembly 205 of the sensor assembly 200. The stereo camera assembly collects data of a surrounding environment of the vehicle 101. The stereo camera assembly includes a first camera 210 and a second camera 215. The cameras 210, 215 each collect "images," i.e., data of visible light collected in a two-dimensional array of values (such as red-green-blue or black-white values). Because the stereo camera assembly includes two cameras 210, 215, the computer 105 can apply a conventional depth-perception algorithm to the two-dimensional images collected by the cameras 210, 215 to generate a three-dimensional mapping of the surrounding environment. That is, while a single camera 210, 215 can collect data as a two-dimensional projection of a three-dimensional environment, the computer 105 can use images from both cameras 210, 215 to determine a distance from the vehicle 101 to an object identified in the images, i.e., a "depth" of the object.

Each camera 210, 215 defines a respective coordinate system having orthogonal axes x, y, z having an origin at the camera 210, 215, as shown in FIG. 2. Each camera 210, 215 collects data in their respective coordinate system, a "camera coordinate system" for each camera 210, 215. Each camera 210, 215 defines a neutral position. In this context, the "neutral position" is the orientation of the camera 210, 215 when the vehicle 101 is not moving. That is, the neutral position is the position of the camera 210, 215 with no displacement, described below. The coordinate system defined when the camera 210, 215 is in the neutral position is a "neutral camera coordinate system." The neutral camera coordinate system defines orthogonal axes x', y', z' having respective origins at the camera 210, 215, where the apostrophe indicates the coordinate system in the neutral position. That is, when each camera 210, 215 receives vibrations, each camera 210, 215 can move from the neutral position, and the camera coordinate system x, y, z can rotate relative the neutral camera coordinate system x', y', z', as shown in FIG. 3.

The vehicle 101 defines a vehicle coordinate system having orthogonal axes X, Y, Z and an origin at a specified point in the vehicle 101, e.g., a center point of the vehicle 101. Thus, the neutral camera coordinate system x', y', z' remains fixed relative to the vehicle coordinate system X, Y, Z, and the computer 105 can determine a linear transformation using conventional linear algebra techniques to transform data from the neutral camera coordinate system x', y', z' to the vehicle coordinate system X, Y, Z. The camera coordinate system x, y, z can rotate relative to the neutral coordinate system x', y', z', and thus when the computer 105 uses data in the rotate camera coordinate system x, y, z, the rotation of the camera coordinate system x, y, z from the neutral camera coordinate system x', y', z' can introduce errors to the data when transformed into the vehicle coordinate system X, Y, Z.

Each camera 210, 215 defines a respective focal length $f$. The "focal length" is a distance between an optical center of the lens of the camera 210, 215 and the data collector of the camera 210, 215. That is, the focal length defines the field of view and magnification of the camera 210, 215. A camera 210, 215 that has a larger focal length $f$ than another camera 210, 215 has a narrower field of view of the other camera 210, 215 and a higher magnification than the other camera 210, 215. That is, the camera 210, 215 with the higher focal length $f$ can capture images of objects farther away from the camera 210, 215 than the camera 210, 215 with the smaller focal length $f$. The focal length $f$ of the camera 210, 215 can be, e.g., 35 millimeters (mm), 50 mm, 75 mm, etc.

The cameras 210, 215 are supported on a mount 220. The mount fixes the cameras to the sensor assembly 200. The cameras can be positioned on the mount 220 at a specified baseline distance B from each other. The computer 105 uses the baseline distance B with the images collected by the cameras 210, 215 to determine the depth of objects in the images. The baseline distance B can be determined based on a specified minimum depth to detect objects. That is, a manufacturer can determine a specified minimum depth at which the cameras 210, 215 should detect objects, and the manufacturer can install the cameras 210, 215 at the baseline distance B according to the specified minimum depth. The baseline distance B can be determined using conventional vision algorithms. For example, the specified minimum depth can be 1 meter, and the baseline distance B can be 0.66 meters.

The stereo camera assembly 205 includes one or more strain sensors 225. The strain sensors 225 measure "mechanical strain," i.e., elastic deformation caused by mechanical stresses. When the vehicle 101 travels on a roadway, deviations in the roadway (such as gravel, potholes, etc.) can cause the vehicle 101 to vibrate. The vibrations can induce mechanical strain(s) on the cameras 210, 215, distorting collected images. The strain sensors 225 measure the mechanical strain on the cameras 210, 215. For example, the strain sensor 225 can be a strain gauge that includes a metallic wire that elastically deforms when mechanical strain is applied. The elastic deformation changes the electrical resistance of the wire, and the computer 105 can measure the change in electrical resistance to determine the mechanical strain applied to the strain sensor 225. Alternatively or additionally, the strain sensor 225 can be an accelerometer that measures an acceleration when mechanical strain is applied. The computer 105 can, based on the measured acceleration, determine the strain applied to the strain sensor 225. Yet further alternatively or additionally, the strain sensor 225 can be a strain bolt, i.e., a fastener that includes a metallic strain gauge, as described above. The cameras 210, 215 can be fixed to the mount 220 with one or more strain bolts as the strain sensors 225. Yet further alternatively or additionally, the strain sensor 225 can be an optical strain gauge that includes an optical fiber including a plurality of notches that stretch when the optical fiber is deformed by mechanical strain. The stretched notches change the speed of light and/or the wavelength of the light travelling through the optical fiber, and the computer 105 can, based on the change in the speed and/or wavelength of light receive through the optical fiber, determine the mechanical strain.

Based on the strain data and the operation data, the computer 105 can identify a displacement of the camera 210, 215. The "displacement" is a movement of the camera 210, 215 from the neutral position in a three-dimensional coordinate system, e.g., the neutral camera coordinate system x', y', z'. That is, the displacement includes a lateral displacement in the x direction, a longitudinal displacement in the y direction, and a vertical displacement in the z direction. Additionally, the displacement can define a rotation θ between the x and x' axes, a rotation ϕ between the y and y' axis, and a rotation γ between the z and z' axes. The mechanical strain on the camera 210, 215 can displace the camera 210, 215 away from the respective neutral position to induce the displacement. Operation data can indicate displacement of a camera 210, 215. For example, a change in pressure in air in a tire can cause a vibration that displaces the camera 210, 215 from the respective neutral position.

The computer 105 can input images from cameras 210, 215 to a machine learning program that outputs the displacement of the vehicle camera 210, 215 from the neutral position. As described further below, the machine learning program can be, e.g., a deep neural network, a gradient boosted tree, etc. The machine learning program outputs the displacement based on the strain data and the operation data. The computer 105 can input the strain data and operation data from a plurality of vehicle components 115 to the machine learning program to output the displacement of each vehicle camera 210, 215. The computer 105 input further data including at least one of a vehicle speed or a vehicle acceleration to the machine learning program to output the displacement of each vehicle camera 210, 215. That is, the computer 105 can input strain data of the first vehicle camera 210 and the operation data to the machine learning program to output a displacement of the first vehicle camera 210, and the computer 105 can input strain data of the second vehicle camera 215 and the operation data to the machine learning program to output a displacement of the second vehicle camera 215. The output of the machine learning program can include more displacement data than input strain data. That is, the strain data can be collected at a specific frequency, i.e., at a certain rate of measurements per second. The machine learning program can output the displacement data at a higher frequency than the input strain data, providing a finer resolution of displacement data than the resolution of the strain data. The higher resolution of the displacement data can account for intra-image effects between successive images collected by the cameras 210, 215, e.g., rolling shutter effects, blur effects, etc.

Based on the displacement, the computer 105 can identify a transformation matrix that transforms data from each vehicle camera 210, 215 to their respective neutral camera coordinate systems x', y', z'. That is, each camera 210, 210, when displaced, collects data in its respective camera coordinate system x, y, z. The transformation matrix transforms data from the camera coordinate system x, y, z to the neutral camera coordinate system x', y', z' of each vehicle camera 210, 215. The "transformation matrix" is a matrix that maps data in the camera coordinate system x, y, z to the neutral camera coordinate system x', y', z' based on the rotations θ, ϕ, γ caused by the displacement and the focal length $f$ of each vehicle camera 210, 215. The computer 105 can use the transformation matrix and the inverse of the transformation matrix to transform data collected in the camera coordinate system x, y, z to the neutral camera coordinate system x', y', z'. Because each camera 210, 215 collects two-dimensional image data, each camera 210, 215 can collect data in only the x, y axes of the camera coordinate system x, y, z. For example, the transformation matrix can be:

$$\begin{bmatrix} x' \\ y' \\ z' \end{bmatrix} = \begin{bmatrix} \cos\theta\cos\gamma & \begin{matrix}-\cos\phi\sin\gamma + \\ \sin\phi\sin\theta\cos\gamma\end{matrix} & (\sin\phi\sin\gamma + \cos\phi\sin\theta\cos\gamma)f \\ \cos\theta\sin\gamma & \begin{matrix}\cos\phi\cos\gamma + \\ \sin\phi\sin\theta\sin\gamma\end{matrix} & (-\sin\phi\cos\gamma + \cos\phi\sin\theta\sin\gamma)f \\ -\dfrac{\tan\theta}{f\cos\phi} & \dfrac{\tan\phi}{f} & 1 \end{bmatrix} \begin{bmatrix} x \\ y \\ 1 \end{bmatrix} \quad (1)$$

where θ, ϕ, γ are the rotation angles described above and shown in FIG. 2.

The computer 105 can apply the transformation matrix to the data collected by the camera 210, 215 to generate transformed data. The "transformed data" represent an image that the vehicle camera 210, 215 would have captured in the neutral position. The computer 105 can identify a first transformation matrix that transforms data from the first vehicle camera 210 to the neutral camera coordinate system of the first vehicle camera 210, i.e., "first transformed data." The computer 105 can apply the first transformation matrix to data from the first vehicle camera 210 to generate the first transformed data. The computer 105 can identify a second transformation matrix that transforms data from the second vehicle camera 215 to the neutral camera coordinate system of the second vehicle camera 215, i.e., "second transformed data." The computer 105 can apply the second transformation matrix to data from the second vehicle camera 215 to generate the second transformed data.

With the first transformed data and the second transformed data, the computer 105 can generate a three-dimensional image. As described above, the computer 105 can use a conventional three-dimensional modeling algorithm that combines respective pixels of the first transformed data with corresponding pixels of the second transformed data to generate the three-dimensional image. For example, the three-dimensional modeling algorithm can be, e.g., a stereo vision disparity map algorithms, fusion of monocular stereo vision reconstruction algorithms, an affine reconstruction algorithm, a Euclidean reconstruction algorithm, etc.

The computer 105 can identify one or more objects based on the transformed data. For example, the computer 105 can identify another vehicle 101. In another example, the computer 105 can identify markings on a roadway indicating, e.g., lane boundaries, shoulder boundaries, etc. The computer 105 can identify an object in the three-dimensional image. The computer 105 can identify a distance from the vehicle camera 210, 215 to the object based on the depth data in the three-dimensional image. That is, the computer 105 can use a conventional depth-determining algorithm with the three-dimensional data from the three-dimensional image to determine a distance from the vehicle 101 to each pixel in the three-dimensional image.

The computer 105 can actuate one or more components 115 based on the transformed data. That is, upon identifying one or more objects in the image, the computer 105 can actuate the components 115 based on the identified objects. For example, the computer 105 can actuate a propulsion, a steering assembly, and/or a brake to avoid an identified vehicle 101. In another example, the computer 105 can actuate the steering assembly to move the vehicle 101 between roadway markings.

The example described above uses data from two cameras 210, 215, i.e., two sensors that collect image data. Alternatively, the sensor assembly 200 can include two other sensors 110, e.g., lidar, radar, etc., and the computer 105 can input two-dimensional data from the other sensors 110 to generate transformed data and to identify the objects. For example, the machine learning program can be trained with lidar and/or radar data in addition to image data to output a displacement of the sensors 110. Thus, the computer 105 can generate three-dimensional images from two dimensional data from any of a camera, a lidar, and/or a radar.

Figure 4:
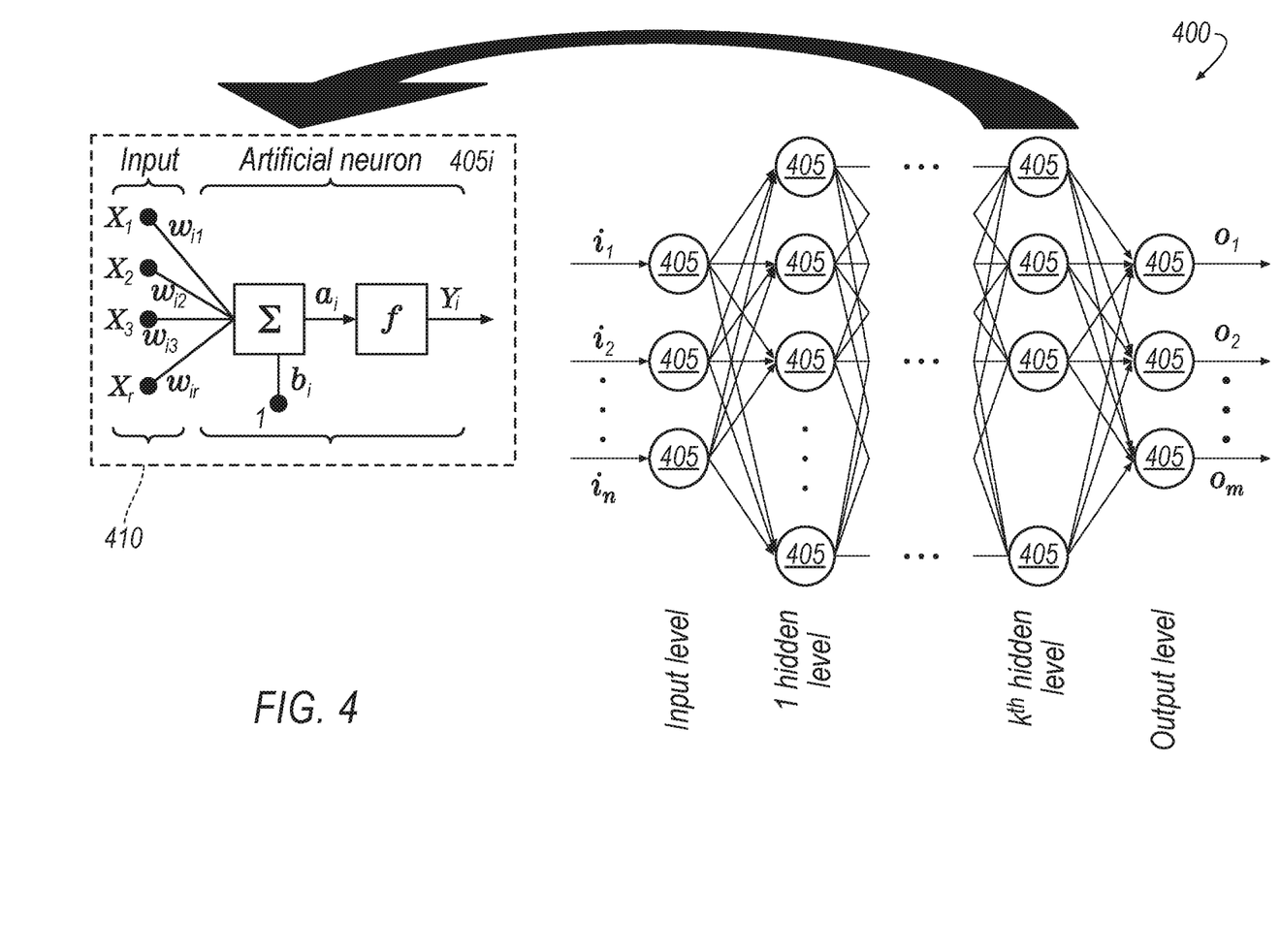
FIG. 4 is a diagram of an example machine learning program for processing data from the sensors.

FIG. 4 is a diagram of an example machine learning program 400. The machine learning program 400 can be a deep neural network (DNN) 400 that could be trained to identify a displacement of a vehicle camera from a neutral position. The DNN 400 can be a software program that can be loaded in memory and executed by a processor included in the server 130, for example. The DNN 400 can include n input nodes 405, each accepting a set of inputs i (i.e., each set of inputs i can include one or more inputs X). The DNN 400 can include m output nodes (where m and n may be, but typically are not, a same natural number) provide sets of outputs $o_1 \ldots o_m$. The DNN 400 includes a plurality of layers, including a number k of hidden layers, each layer including one or more nodes 405. The nodes 405 are sometimes referred to as artificial neurons 405, because they are designed to emulate biological, e.g., human, neurons. The neuron block 410 illustrates inputs to and processing in an example artificial neuron 405$i$. A set of inputs $X_1 \ldots X_r$ to each neuron 405 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 405$i$ output $Y_i$. The activation function $f$ can be a variety of suitable functions, typically selected based on empirical analysis. As illustrated by the arrows in FIG. 4, neuron 405 outputs can then be provided for inclusion in a set of inputs to one or more neurons 405 in a next layer.

The DNN 400 can be trained to accept as input data, e.g., reference images from a camera, and to output one or more parameters for identifying the displacement. For example, the DNN 400 could be trained to output a displacement of the camera from a neutral position.

That is, the DNN 400 can be trained with ground truth data, i.e., data about a real-world condition or state. Weights w can be initialized by using a Gaussian distribution, for example, and a bias b for each node 405 can be set to zero. Training the DNN 400 can including updating weights and biases via conventional techniques such as back-propagation with optimizations.

A set of weights w for a node 405 together are a weight vector for the node 405. Weight vectors for respective nodes 405 in a same layer of the DNN 400 can be combined to form a weight matrix for the layer. Bias values b for respective nodes 405 in a same layer of the DNN 400 can be combined to form a bias vector for the layer. The weight matrix for each layer and bias vector for each layer can then be used in the trained DNN 400.

In the present context, the ground truth data used to train the DNN 400 could include image data annotated with the respective displacement of the vehicle camera that generated each image. For example, a sensor can collect a plurality of images at specified displacement values, and then the images can be labeled for training the DNN 400, i.e., tags can be specified identifying the displacement in the images. The DNN 400 can then be trained to output data values that correlate to the displacement, and the output data values can be compared to the annotations to identify a difference, i.e., a cost function of the output data values and the input annotated images. The weights w and biases b can be adjusted to reduce the output of the cost function, i.e., to minimize the difference between the output data values and the input annotated images. When the cost function is minimized, the server 125 can determine that the DNN 400 is trained.

Figure 5:
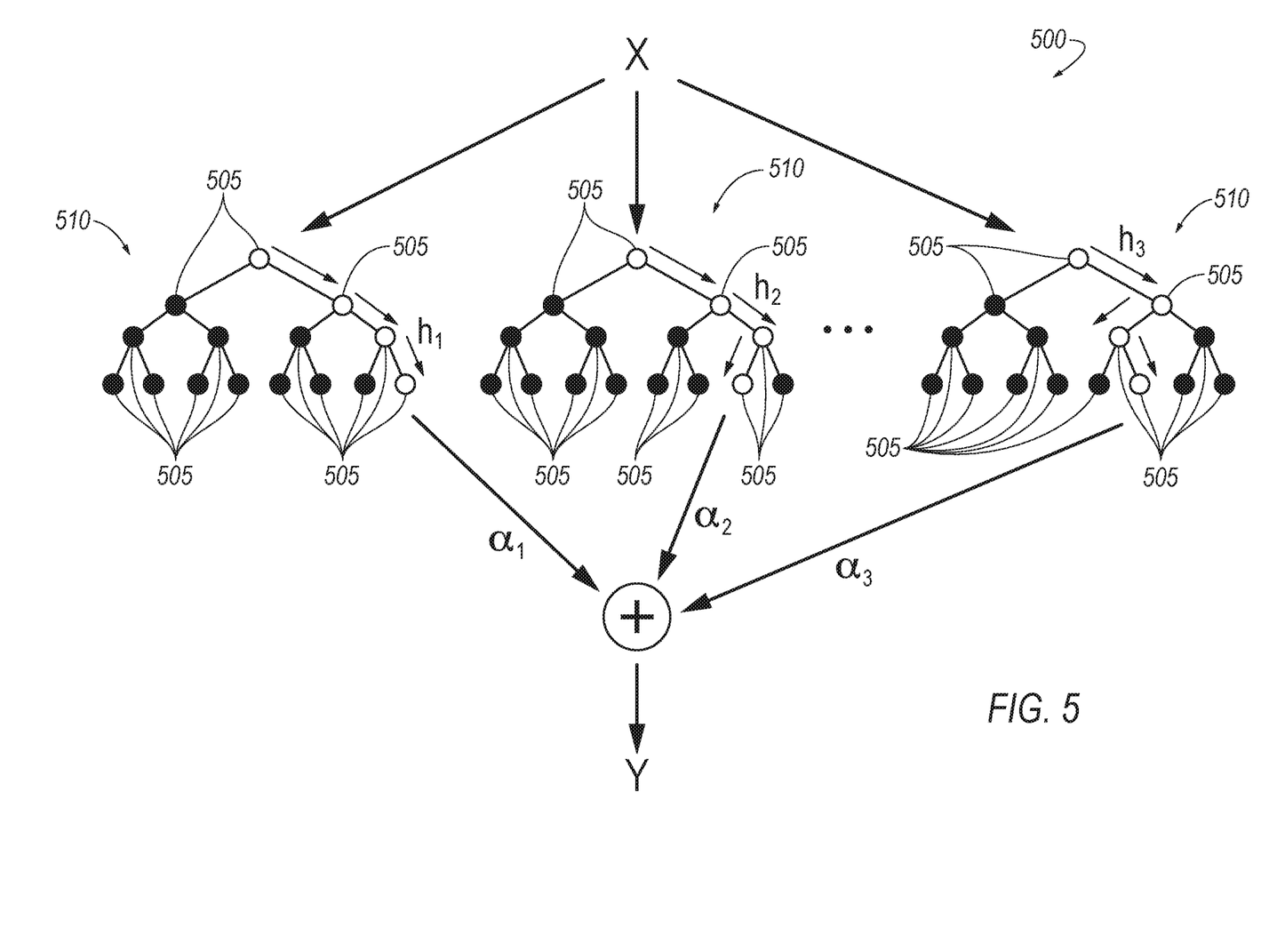
FIG. 5 is a diagram of another example machine learning program for processing data from the sensors.

FIG. 5 is a diagram of another example machine learning program 500. The machine learning program 500 can be a gradient-boosted tree (GBT) algorithm 500. The GBT 500 can be a software program that can be loaded in memory and executed by a processor included in the server 130, for example. The GBT 500 can include nodes 505 arranged in one of n trees 510. Each tree 510 defines a residual function $h_t(x)$ that defines a negative gradient for a predicted model F. That is, the model F is a function that is adjusted to correlate reference input data X to desired outputs Y. Each node 505 represents a decision in the tree 510 at which the input X is compared to a specific regression value. The input X follows a path down the tree 510 based on the specific regression values to define the residual function $h_t(X)$. The residual functions $h_t(X)$ output a weight $\alpha_i$ for each tree 510, and the weights $a_i$ are then recursively applied to the residual functions $h_t(X)$ to update the model F. When the change in the weights $\alpha_i$ falls below a threshold (i.e., the weights $\alpha_i$ converge), the server 125 can determine that the GBT 500 is trained.

The GBT 500 can be trained on reference images annotated with the displacement of the vehicle camera and the operation data when the image was captured. For example, the vehicle camera can collect a plurality of images at specified displacement values and with specified mechanical strains and operation data, and then the images can be labeled for training the GBT 500, i.e., tags can be specified identifying the displacement, mechanical strain, and operation data in the images. Each node 505 can be a comparison of a specified regression value, e.g., a value of specific operation data, a value of specific mechanical strain, a value of a specific displacement, etc. The GBT 500 can then be trained to output data values that correlate to the displacement, and the output values can be compared to the annotations to identify a difference. The difference can be used to identify the weights $\alpha_i$ that are then applied to the residual functions $h_t(X)$.

The computer 105 can use the GBT 500 to determine the displacement of the vehicle camera. The computer 105 can input an image to the GBT 500, following each tree 510 and its respective residual function $h_t(X)$. The GBT 500 can output a set of values Y that include the displacement. Because the GBT 500 is trained with mechanical strain and operation data, the residual functions $h_t(X)$ provide output that considers the mechanical strain and the operation data.

Figure 6:
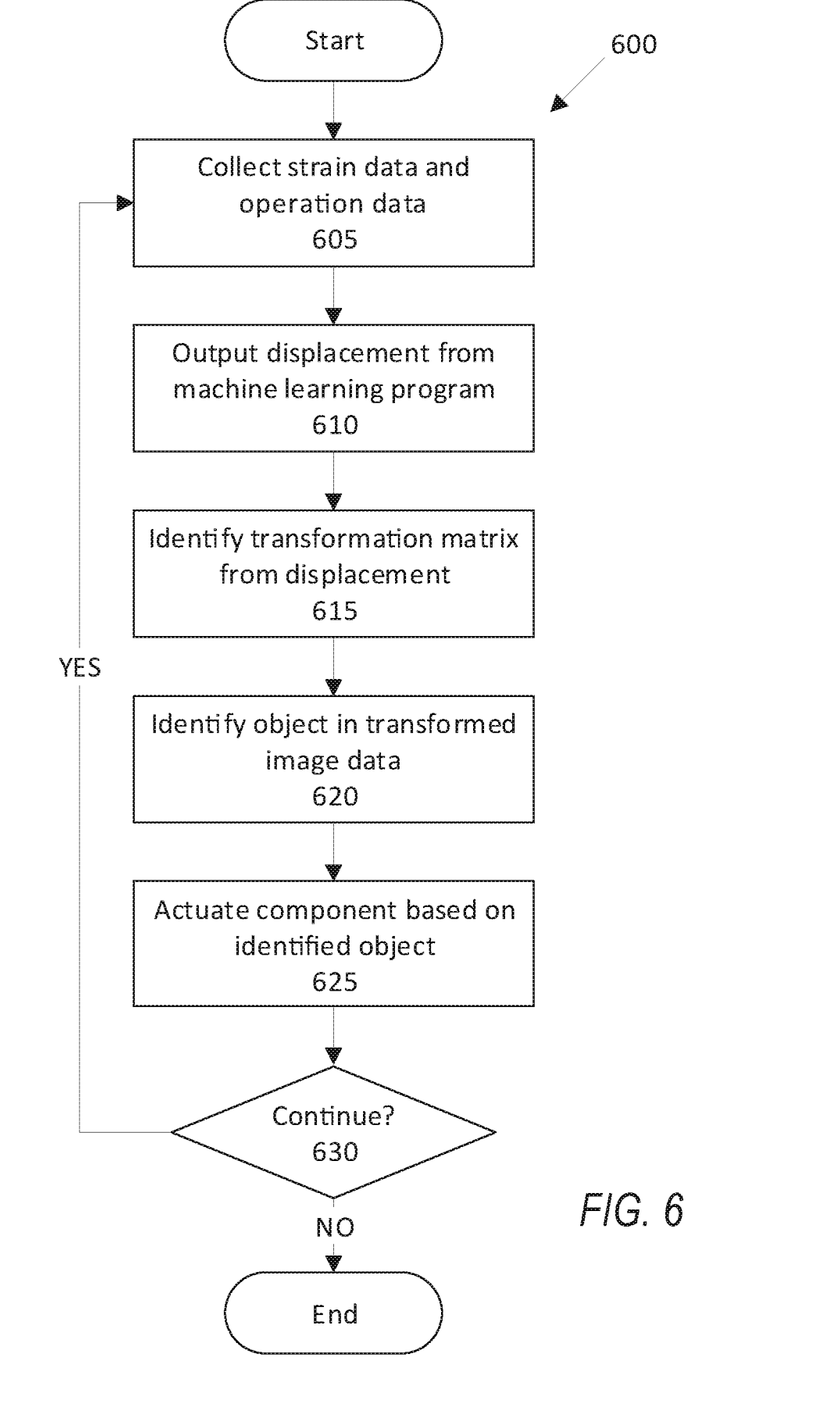
FIG. 6 is a diagram of an example process for operating the sensors of the vehicle.

FIG. 6 is a diagram of an example process 600 for operating sensors 110 of a vehicle 101. The process 600 begins in a block 605, which a computer 105 collects strain data of cameras 210, 215 of a stereo camera assembly 205 in a sensor assembly 200 and operation data of one or more components 115. As described above, the computer 105 can collect the strain data from one or more strain sensors, e.g., strain gauges (such as optical strain gauges, mechanical strain gauges, etc.), strain bolts, accelerometers, etc. The computer 105 can collect the operation data from the components 115, i.e., data describing at least one of an output or a state of the vehicle component 115. For example, the operation data can include, e.g., a tire pressure, a suspension length, a wheel speed, a brake pressure, etc. Additionally, the computer 105 can collect acceleration data from one or more IMU sensors, e.g., accelerometers, gyroscopes, pressure sensors, magnetometers, etc.

Next, in a block 610, the computer 105 inputs the strain data and the component data to a machine learning program to output a displacement for each camera 210, 215. As described above, the machine learning program can be a deep neural network 400 or a gradient boosted tree 500. The machine learning program can be trained to output the displacement for the cameras 210, 215 based on the respective strain data for each camera 210, 215 and the operation data. For example, the machine learning program can be trained receive tire pressure data as input and to output the displacement based on the strain data and the tire pressure data.

Next, in a block 615, the computer 105 identifies a respective transformation matrix from the displacement of each camera 210, 215. As described above, the transformation matrix transforms data collected in a coordinate system of one of the cameras 210, 215 to a coordinate system of the vehicle 101. The transformation matrix transforms each pixel of images collected by the cameras 210 to the coordinate system of the vehicle 101 to generate transformed data.

Next, in a block 620, the computer 105 identifies an object in the transformed data. As described above, with transformed data from both cameras 210, 215, the computer 105 can use a conventional depth-perception algorithm to identify a three-dimensional object. That is, the computer 105 can determine a depth from the vehicle 101 to the object with the depth-perception algorithm and data from both cameras 210, 215.

Next, in a block 625, the computer 105 actuates one or more components 115 based on the identified object. As described above, the computer 105 can actuate components 115 to avoid a collision with the identified object. For example, the computer 105 can actuate a propulsion, a steering assembly, and/or a brake to avoid the identified object. In another example, the computer 105 can actuate the steering assembly to move the vehicle 101 between roadway markings.

Next, in a block 630, the computer 105 determine whether to continue the process 600. For example, the computer 105 can determine to continue the process 600 when the identified object is no longer in the field of view of the cameras 210, 215. If the computer 105 determines to continue, the process 600 returns to the block 605. Otherwise, the process 600 ends.

Computing devices discussed herein, including the computer 105, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
    collect strain data measuring mechanical strain on a vehicle camera at a specific frequency;
    input the strain data and operation data of a first vehicle component, the operation data describing at least one of an output or a state of the first vehicle component, to a machine learning program that outputs a displacement of the vehicle camera from a neutral position based on the strain data and the operation data, the machine learning program outputting the displacement for all the strain data collected without applying a threshold to the strain data;
    based on the output displacement of the vehicle camera, identify a transformation matrix that transforms data from the vehicle camera to a coordinate system of the vehicle camera in the neutral position;
    apply the transformation matrix to data collected by the vehicle camera to generate transformed data;
    identify an object based on the transformed data;
    identify a distance from the vehicle camera to the object based on the transformed data; and
    actuate one of the first vehicle component or a second vehicle component based on the transformed data.

2. The system of claim 1, wherein the operation data include at least one of a tire pressure, a suspension length, a wheel speed, or a brake pressure.

3. The system of claim 1, wherein the instructions further include instructions to input further data including at least one of a vehicle speed or a vehicle acceleration to the machine learning program to output the displacement of the vehicle camera.

4. The system of claim 1, wherein the machine learning program is one of a deep neural network or a gradient boosted tree.

5. The system of claim 1, wherein the vehicle component is one of a plurality of vehicle components, and the instructions further include instructions to input the strain data and operation data from the plurality of vehicle components to the machine learning program to output the displacement of the vehicle camera.

6. The system of claim 1, further comprising a strain sensor to collect the strain data, wherein the strain sensor is one of a strain gauge, an accelerometer, or a strain bolt.

7. The system of claim 1, wherein the transformation matrix transforms the data from the vehicle camera based on a focal length of the vehicle camera.

8. The system of claim 1, wherein the displacement includes a lateral displacement, a longitudinal displacement, and a vertical displacement.

9. The system of claim 1, wherein the vehicle camera is a first vehicle camera, the transformation matrix is a first transformation matrix, and the instructions further include instructions to input strain data of a second vehicle camera and the operation data to the machine learning program, to output a displacement of the second vehicle camera, and to identify a second transformation matrix that transforms data from the second vehicle camera to a coordinate system of the second vehicle camera in the neutral position.

10. The system of claim 9, wherein the transformed data is first transformed data, and the instructions further include instructions to apply the second transformation matrix to data from the second vehicle camera to generate second transformed data and to generate a three-dimensional image based on the first transformed data and the second transformed data.

11. The system of claim 10, wherein the instructions further include instructions to identify the object in the three-dimensional image.

12. The system of claim 11, wherein the instructions further include instructions to identify the distance from the vehicle camera to the object based on the three-dimensional image.

13. The system of claim 10, wherein the instructions further include instructions to combine respective pixels of the first transformed data with corresponding pixels of the second transformed data to generate the three-dimensional image.

14. A method, comprising:
    collecting strain data measuring mechanical strain on a vehicle camera at a specific frequency;
    inputting the strain data and operation data of a first vehicle component, the operation data describing at least one of an output or a state of the first vehicle component, to a machine learning program that outputs a displacement of the vehicle camera from a neutral position based on the strain data and the operation data, the machine learning program outputting the displacement for all the strain data collected without applying a threshold to the strain data;

based on the output displacement of the vehicle camera, identifying a transformation matrix that transforms data from the vehicle camera to a coordinate system of the vehicle camera in the neutral position;
applying the transformation matrix to data collected by the vehicle camera;
identifying an object based on the transformed data;
identifying a distance from the vehicle camera to the object based on the transformed data; and
actuating one of the first vehicle component or a second vehicle component based on the transformed data.

15. The method of claim 14, wherein the operation data include at least one of a tire pressure, a suspension length, a wheel speed, or a brake pressure.

16. The method of claim 14, wherein the vehicle camera is a first vehicle camera, the transformation matrix is a first transformation matrix, the method further comprising inputting strain data of a second vehicle camera and the operation data to the machine learning program, outputting a displacement of the second vehicle camera, and identifying a second transformation matrix that transforms data from the second vehicle camera to a coordinate system of the second vehicle camera in the neutral position.

17. The method of claim 16, wherein the transformed data is first transformed data, the method further comprising applying the second transformation matrix to data from the second vehicle camera to generate second transformed data and generating a three-dimensional image based on the first transformed data and the second transformed data.

18. The method of claim 17, further comprising combining respective pixels of the first transformed data with corresponding pixels of the second transformed data to generate the three-dimensional image.

19. A system, comprising a computer including a processor and a memory, the memory storing instructions executable by the processor to:

input strain data measuring mechanical strain on a first vehicle camera and operation data of a first vehicle component, the operation data describing at least one of an output or a state of the first vehicle component, to a machine learning program that outputs a displacement of the first vehicle camera from a neutral position based on the strain data and the operation data;
input strain data of a second vehicle camera and the operation data to the machine learning program to output a displacement of the second vehicle camera;
based on the output displacement of the vehicle camera, identify a first transformation matrix that transforms data from the first vehicle camera to a coordinate system of the first vehicle camera in the neutral position;
identify a second transformation matrix that transforms data from the second vehicle camera to a coordinate system of the second vehicle camera in the neutral position;
apply the first transformation matrix to data collected by the first vehicle camera to generate first transformed data;
apply the second transformation matrix to data from the second vehicle camera to generate second transformed data and to generate a three-dimensional image based on the first transformed data and the second transformed data;
combine respective pixels of the first transformed data with corresponding pixels of the second transformed data to generate the three-dimensional image; and
actuate one of the first vehicle component or a second vehicle component based on the first transformed data.

* * * * *